US010742285B1

(12) United States Patent
Chu et al.

(10) Patent No.: US 10,742,285 B1
(45) Date of Patent: Aug. 11, 2020

(54) EXPLICIT MULTIUSER BEAMFORMING TRAINING IN A WIRELESS LOCAL AREA NETWORK

(71) Applicant: Marvell International Ltd., Hamilton (BM)

(72) Inventors: Liwen Chu, San Ramon, CA (US); Yakun Sun, San Jose, CA (US); Rui Cao, Fremont, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/350,985

(22) Filed: Nov. 14, 2016

Related U.S. Application Data

(60) Provisional application No. 62/255,018, filed on Nov. 13, 2015.

(51) Int. Cl.
*H04B 7/06* (2006.01)
*H04L 5/00* (2006.01)
*H04W 84/12* (2009.01)
*H04B 7/0452* (2017.01)
*H04L 27/26* (2006.01)

(52) U.S. Cl.
CPC ......... *H04B 7/0617* (2013.01); *H04L 5/0055* (2013.01); *H04B 7/0452* (2013.01); *H04L 27/2601* (2013.01); *H04W 84/12* (2013.01)

(58) Field of Classification Search
CPC .................. H04B 7/0617; H04L 5/0055
See application file for complete search history.

(56) References Cited

U.S. PATENT DOCUMENTS 7,599,332 B2    10/2009  Zelst et al.
7,742,390 B2     6/2010  Mujtaba
(Continued)

FOREIGN PATENT DOCUMENTS

CN    101578805 A    11/2009
CN    102013959 A     4/2011

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Jael M Ulysse

(57) ABSTRACT

A first communication device receives respective beamforming training data units simultaneously transmitted to the first communication device by multiple second communication devices. The first communication device generates, based on the respective beamforming training data units received from the multiple second communication devices, respective beamforming feedback data units to be transmitted to respective ones of the multiple second communication devices. The first communication device transmits the respective feedback data units to the respective ones of the multiple second communication devices.

14 Claims, 12 Drawing Sheets

(56) References Cited

U.S. PATENT DOCUMENTS

| | | | |
|---|---|---|---|
| 8,155,138 B2 | 4/2012 | van Nee | |
| 8,270,909 B2 | 9/2012 | Zhang et al. | |
| 8,289,869 B2 | 10/2012 | Sawai | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 9,166,660 B2 | 10/2015 | Chu et al. | |
| 9,197,298 B2 | 11/2015 | Kim et al. | |
| 9,351,297 B2 | 5/2016 | Aboul-Magd et al. | |
| 2005/0181799 A1* | 8/2005 | Laroia | H04L 5/0007 455/450 |
| 2006/0203891 A1* | 9/2006 | Sampath | H04B 7/0417 375/132 |
| 2006/0285483 A1 | 12/2006 | Khan | |
| 2007/0230373 A1* | 10/2007 | Li | H04B 7/0447 370/267 |
| 2007/0298742 A1* | 12/2007 | Ketchum | H04B 7/0617 455/186.1 |
| 2009/0196163 A1 | 8/2009 | Du | |
| 2009/0225697 A1* | 9/2009 | Solomon | H04W 72/046 370/328 |
| 2010/0220614 A1* | 9/2010 | Seong | H04L 5/0051 370/252 |
| 2011/0002219 A1 | 1/2011 | Kim et al. | |
| 2011/0128947 A1* | 6/2011 | Liu | H04L 25/03343 370/338 |
| 2011/0199946 A1* | 8/2011 | Breit | H04B 7/0626 370/310 |
| 2011/0222472 A1* | 9/2011 | Breit | H04B 7/0626 370/328 |
| 2011/0243262 A1 | 10/2011 | Ratasuk et al. | |
| 2011/0261708 A1 | 10/2011 | Grandhi | |
| 2012/0026909 A1* | 2/2012 | Seok | H04B 7/0417 370/252 |
| 2012/0033592 A1* | 2/2012 | Kim | H04B 7/0452 370/310 |
| 2012/0033614 A1* | 2/2012 | Sampath | H04L 27/2613 370/328 |
| 2012/0039196 A1* | 2/2012 | Zhang | H04L 25/03343 370/252 |
| 2012/0051246 A1* | 3/2012 | Zhang | H04L 1/0001 370/252 |
| 2012/0051287 A1* | 3/2012 | Merlin | H04B 7/0617 370/328 |
| 2012/0140753 A1* | 6/2012 | Lee | H04B 7/0452 370/338 |
| 2012/0176921 A1* | 7/2012 | Abraham | H04L 1/0026 370/252 |
| 2012/0177018 A1* | 7/2012 | Abraham | H04L 1/0027 370/338 |
| 2012/0218981 A1* | 8/2012 | Lee | H04B 7/0636 370/338 |
| 2012/0250618 A1* | 10/2012 | Abraham | H04B 7/0417 370/328 |
| 2012/0328034 A1* | 12/2012 | Nabar | H04B 7/0617 375/260 |
| 2013/0044743 A1* | 2/2013 | Zhang | H04L 69/22 370/338 |
| 2013/0058239 A1* | 3/2013 | Wang | H04B 7/0417 370/252 |
| 2013/0094488 A1* | 4/2013 | Choi | H04W 16/28 370/338 |
| 2013/0188567 A1* | 7/2013 | Wang | H04L 5/0094 370/329 |
| 2013/0223427 A1 | 8/2013 | Sohn et al. | |
| 2013/0229996 A1 | 9/2013 | Wang et al. | |
| 2013/0286959 A1* | 10/2013 | Lou | H04W 72/04 370/329 |
| 2014/0044069 A1* | 2/2014 | Bao | H04B 7/0417 370/329 |
| 2014/0093005 A1* | 4/2014 | Xia | H04B 7/0617 375/267 |
| 2014/0160964 A1* | 6/2014 | Trainin | H04W 24/10 370/252 |
| 2014/0192914 A1* | 7/2014 | Liu | H04B 7/0617 375/260 |
| 2014/0254351 A1 | 9/2014 | Newman et al. | |
| 2014/0294019 A1* | 10/2014 | Quan | H04L 1/1614 370/474 |
| 2014/0307612 A1 | 10/2014 | Vermani et al. | |
| 2014/0328242 A1* | 11/2014 | Tong | H04W 48/00 370/312 |
| 2014/0334420 A1* | 11/2014 | You | H04L 25/0204 370/329 |
| 2015/0063128 A1* | 3/2015 | Garikipati | H04B 7/0417 370/252 |
| 2015/0110046 A1* | 4/2015 | Merlin | H04B 7/0452 370/329 |
| 2015/0124689 A1 | 5/2015 | Merlin et al. | |
| 2015/0131517 A1 | 5/2015 | Chu et al. | |
| 2015/0139091 A1 | 5/2015 | Azizi et al. | |
| 2015/0222346 A1* | 8/2015 | Garrett | H04B 7/0617 370/329 |
| 2015/0236770 A1* | 8/2015 | Garrett | H04B 7/0452 370/329 |
| 2015/0288501 A1* | 10/2015 | Kwon | H04L 5/0007 370/329 |
| 2015/0289147 A1* | 10/2015 | Lou | H04B 7/0408 370/329 |
| 2015/0304007 A1* | 10/2015 | Chu | H04B 7/0417 375/267 |
| 2015/0319747 A1 | 11/2015 | Chu et al. | |
| 2015/0319782 A1 | 11/2015 | Chu et al. | |
| 2015/0333812 A1* | 11/2015 | Breit | H04B 7/0413 370/329 |
| 2016/0014804 A1* | 1/2016 | Merlin | H04L 5/0044 370/329 |
| 2016/0037330 A1* | 2/2016 | Ponnuswamy | H04W 8/186 370/328 |
| 2016/0043781 A1* | 2/2016 | Cho | H04L 5/0051 342/373 |
| 2016/0072564 A1* | 3/2016 | Li | H04L 5/0025 370/329 |
| 2016/0073387 A1 | 3/2016 | Yang et al. | |
| 2016/0081075 A1* | 3/2016 | Kim | H04B 7/0617 370/329 |
| 2016/0100396 A1* | 4/2016 | Seok | H04L 5/003 370/329 |
| 2016/0100408 A1* | 4/2016 | Hedayat | H04L 65/4076 370/329 |
| 2016/0150505 A1 | 5/2016 | Hedayat | |
| 2016/0165574 A1 | 6/2016 | Chu et al. | |
| 2016/0165589 A1 | 6/2016 | Chu et al. | |
| 2016/0165607 A1* | 6/2016 | Hedayat | H04W 72/0453 370/338 |
| 2016/0255606 A1 | 9/2016 | Chu et al. | |
| 2016/0261327 A1* | 9/2016 | Merlin | H04W 72/0413 |
| 2016/0295581 A1 | 10/2016 | Ghosh et al. | |
| 2016/0295629 A1* | 10/2016 | Gubeskys | H04W 56/0015 |
| 2016/0323879 A1 | 11/2016 | Ghosh et al. | |
| 2017/0141828 A1 | 5/2017 | Tosato et al. | |
| 2017/0188390 A1 | 6/2017 | Adachi et al. | |
| 2017/0202026 A1 | 7/2017 | Ahn et al. | |
| 2017/0289911 A1 | 10/2017 | Kim et al. | |
| 2017/0338919 A1 | 11/2017 | Lim et al. | |
| 2018/0220443 A1 | 8/2018 | Kim et al. | |

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

(56) References Cited

OTHER PUBLICATIONS

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.16™—2012 (Revision of IEEE Std. 802.16/2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Ansari et al., "Unified MIMO Pre-Coding Based on Givens Rotation, The Institute of Electrical and Electronics Engineers, doc. No. IEEE C802.16e-04/516r2," pp. 1-13, (Jan. 11, 2005).

Chen, "Home Network Basis: Transmission Environments and Wired/Wireless Protocols," Prentice Hall, pp. 1-26 (Jul. 2006).

Chun et al., "Legacy Support on HEW frame structure," doc: IEEE 11-13/1057r0, *The Institute of Electrical and Electronics Engineers, Inc.*, pp. 1-8 (Sep. 2013).

Hiertz et al., "The IEEE 802.11 Universe," IEEE Communications Magazine, pp. 62-70, (Jan. 2010).

Love et al., "An Overview of Limited Feedback in Wireless Communication Systems," IEEE J. on Selected Areas in Communications, vol. 26, No. 8, pp. 1341-1365 (Oct. 2008).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Seok et al., "HEW PPDU Format for Supporting MIMO-OFDMA," IEEE 802.11-14/1210r0, 16 pages, (Sep. 14, 2014).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Van Nee et al. "The 802.11 n MIMO-OFDM Standard for Wireless LAN and Beyond," Wireless Personal Communications, vol. 37, pp. 445-453 (Jun. 2006).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Merlin et al., "Trigger Frame Format," IEEE Draft, doc. IEEE 802.11-15/0877r1, vol. 802.11ax, No. 1, 16 pages (Jul. 13, 2015).

\* cited by examiner

EXPLICIT MULTIUSER BEAMFORMING TRAINING IN A WIRELESS LOCAL AREA NETWORK

CROSS-REFERENCE TO RELATED APPLICATION

This disclosure claims the benefit of U.S. Provisional Patent Application No. 62/255,018, entitled "Explicit UL MU MIMO Beamforming" and filed on Nov. 13, 2015, the disclosure of which is incorporated herein by reference in its entirety.

FIELD OF THE DISCLOSURE

The present disclosure relates generally to communication networks and, more particularly, to beamforming training in wireless local area networks.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, 802.11n, and 802.11 ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for beamforming training in a wireless communication network includes receiving, at a first communication device from multiple second communication devices, respective beamforming training data units simultaneously transmitted by the multiple second communication devices. The method also includes generating, at the first communication device based on the respective beamforming training data units received from the multiple second communication devices, respective beamforming feedback data units to be transmitted to respective ones of the multiple second communication devices. The method additionally includes transmitting, from the first communication device, the respective feedback data units to the respective ones of the multiple second communication devices.

In another embodiment, an apparatus comprises a network interface device having one or more integrated circuits configured to receive respective beamforming training data units simultaneously transmitted by multiple communication devices. The one or more integrated circuits are further configured to generate, based on the respective beamforming training data units received from the multiple communication devices, respective beamforming feedback data units to be transmitted to respective ones of the multiple communication devices. The one or more integrate circuits are additionally configured to transmit the respective beamforming feedback data units to the respective ones of the multiple communication devices.

DETAILED DESCRIPTION

Figure 1:
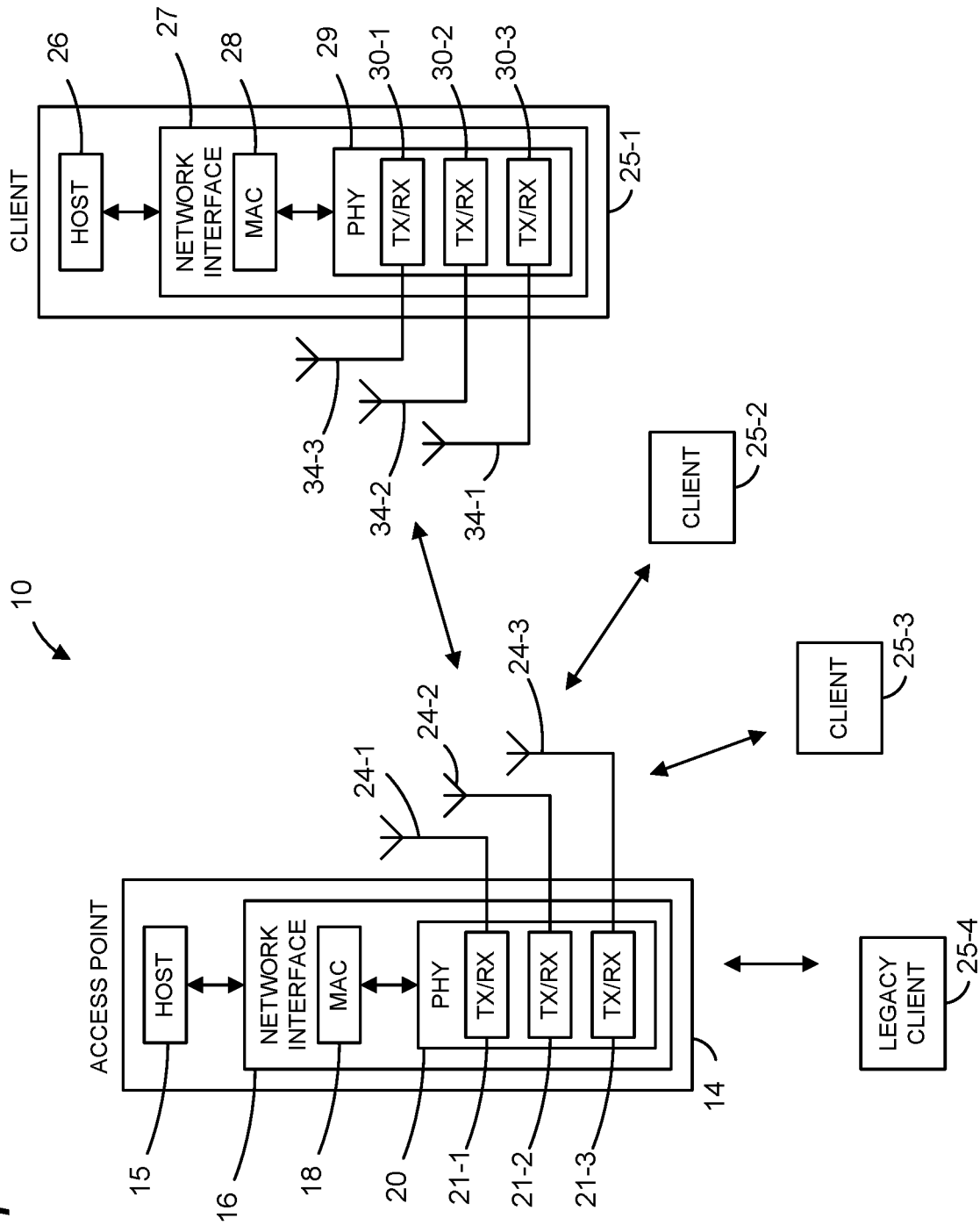
FIG. 1 is a block diagram of an example wireless local area network (WLAN), according to an embodiment.

In embodiments described below, a wireless network device such as an access point (AP) of a wireless local area network (WLAN) simultaneously communicates with multiple client devices such as client stations (STAs). In an embodiment, the AP and the client stations support single user and multi-user uplink transmissions in the direction from the client stations to the AP. In single user transmission, in an embodiment, a single client station transmits data to the AP at a given time. In multi-user transmission, multiple client stations simultaneously transmit data to the AP, in various embodiments. For example, multiple client stations simultaneously transmit data to the AP by transmitting the data using respective different frequency portions or sub-channels of an orthogonal frequency division multiple access (OFDMA) transmission and/or using respective different spatial streams of a multi-user multiple input multiple output (MU-MIMO) transmission, in various embodiments.

In some embodiments, client stations that are equipped with multiple antennas are configured to utilize the multiple antennas to beamform or steer transmissions to the AP. Beamforming is used by such client stations to beamform single-user uplink transmissions and/or to beamform multi-user uplink transmissions to the AP, in various embodiments. Generally speaking, uplink beamforming involves obtaining a description of a communication channel from a client station to the AP, and determining, based on the description of the communication channel, determining, based on the channel description, beamforming coefficients (e.g., a steering matrix) to be applied to subsequent transmissions from the client station to the AP. To obtain characteristics of the communication channel from a client station to the AP, in explicit beamforming, the client station transmits a beamforming training packet, such as a sounding packet, to the AP. The AP receives the beamforming training packet from the client station and, based on training signals included in the beamforming training packet, develops a channel description, such as an estimate of the channel response of the communication channel from the client station to the AP. The AP then feeds back the channel description or beamforming coefficients determined based on the channel description, in some form, to the client station. The client station utilizes this information fed back from the AP to beamform or steer subsequent transmissions from the client station to the AP.

To efficiently obtain characteristics of respective communication channels from multiple client stations to the AP, in an embodiment, the AP and the multiple client stations perform a beamforming procedure in which the multiple client stations simultaneously transmit beamforming training packets to the AP, for example using OFDMA and or MU-MIMO transmission to the AP. The AP determines, based on the beamforming training packets, respective beamforming feedback information for the multiple client stations. The AP then transmits the respective beamforming information to the client stations, for example by including the beamforming feedback information in a multi-user (e.g., OFDMA and/or MU MIMO) downlink transmission from the AP to the client feedback to the multiple client stations. Performing uplink beamforming training simultaneously with multiple client stations results in a reduced system overhead associated with uplink beamforming training as compared to systems in which uplink beamforming training is performed sequentially with respective ones of the multiple client stations, in at least some embodiments.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

Figure 2:
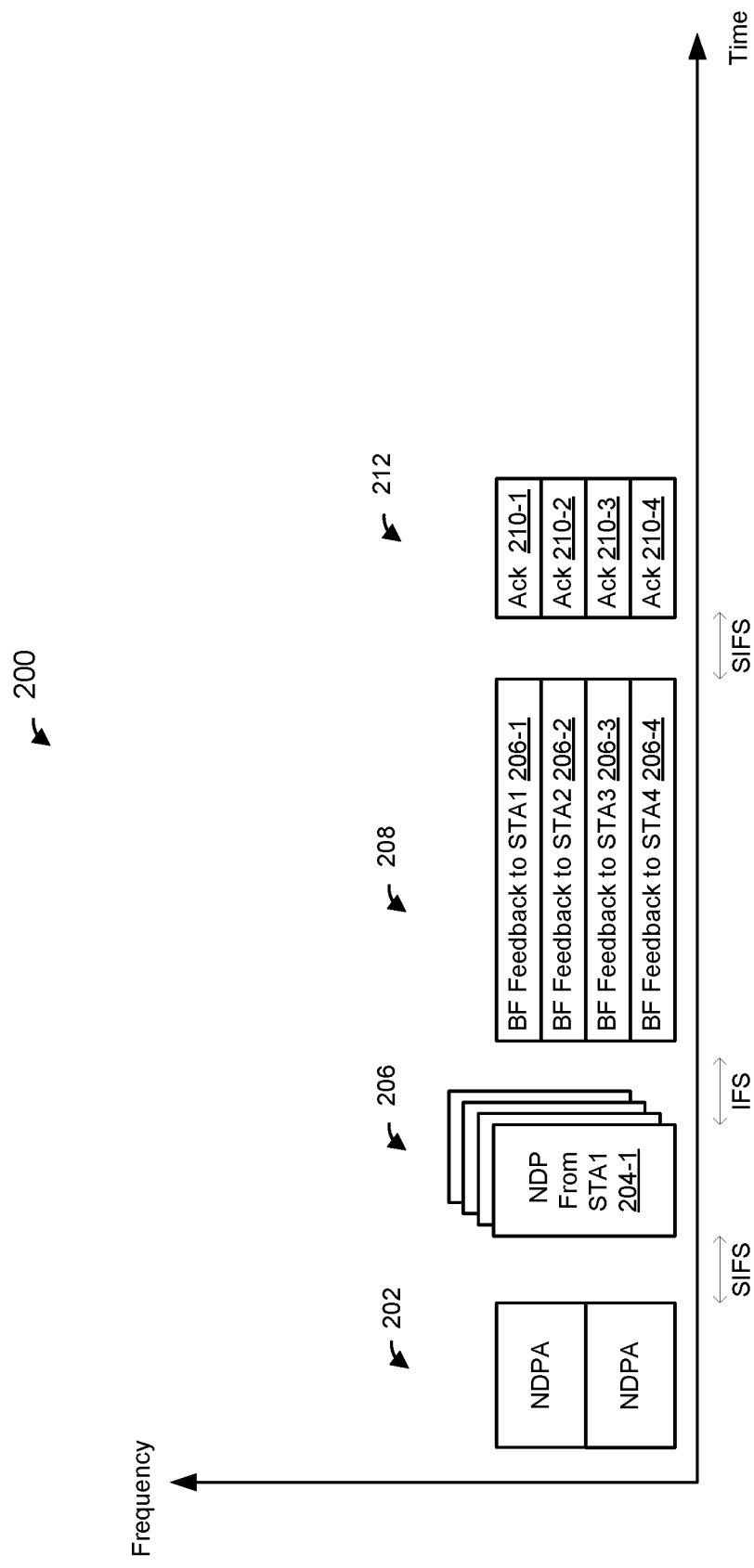
FIG. 2 is a diagram of an example transmission sequence in a WLAN, according to an embodiment.

FIG. 2 is a diagram of an example transmission sequence 200 in a WLAN, such as the WLAN 10 of FIG. 1, according to an embodiment, in which an AP, such as the AP 14, performs beamforming training with multiple client stations, such as multiple ones of the client stations 25. In the example embodiment of FIG. 2, the AP performs beamforming training simultaneously with four client stations (STA1, STA2, STA3, and STA4). In other embodiments, the AP performs beamforming training simultaneously with a different number (2, 3, 5, 6, 7, 8, 8, 10, etc.) of client stations.

With continued reference to FIG. 2, the AP generates and transmits an announcement data unit 202. The announcement data unit 202 is a downlink (DL) data unit because the announcement data unit 202 is transmitted in the downlink direction from the AP to client stations, in an embodiment. In an embodiment, the announcement data unit 202 is a null data packet announcement (NDPA) data unit that omits a data portion. In another embodiment, the announcement data unit 202 includes a data portion. The announcement data unit 202 includes a control frame, such as a UL beamforming announcement control frame defined by the first communication protocol for initiation of uplink beamforming training, in an embodiment. In another embodiment, the announcement data unit 202 includes a trigger frame of beamforming announcement trigger type. In other embodiments, the announcement data unit 202 includes a beamforming announcement frame that conforms to another suitable format.

In an embodiment, the announcement data unit 202 is a duplicate data unit that is duplicated in each of a plurality of sub-bands of a bandwidth in which the beamforming training is being performed. Thus, for example, in an embodiment in which the beamforming training is being performed in a 40 MHz-wide communication channel, the announcement data unit 202 is duplicated in each of two 20 MHz-wide subchannels of the 40 MHz-wide communication channel. As another example, in an embodiment in which the beamforming training is being performed in an 80 MHz-wide communication channel, the announcement data unit 202 is duplicated in each of four 20 MHz-wide subchannels of the 80 MHz-wide communication channel. In other embodiments, the announcement data unit 202 is duplicated in another suitable number of subchannels of the communication channel in which the beamforming training is being performed. Alternatively, the announcement data unit 202 is not a duplicate frame but rather occupies the entire bandwidth in which the beamforming training is being performed.

In an embodiment, the announcement data unit 202 identifies multiple client stations that are intended participants of a beamforming training procedure being announced by the announcement data unit 202. For example, the announcement data unit 202 includes a respective identifier, such as an association identifier (AID) or a partial AID (PAID), associated with each of the client stations STA1, STA2, STA3, and STA4 that is an intended participant of the beamforming training procedure being announced by the announcement data unit 202, in an embodiment. Additionally, the announcement data unit 202 indicates respective resources to be used by identified the client stations STA1, STA2, STA3, and STA4 during the beamforming procedure, such as resources to be used for uplink transmission of training packets by the client stations to the AP and/or resources for receiving beamforming training feedback from the AP, in an embodiment. For example, the announcement data unit 202 indicates respective resources (e.g., frequency portions and/or spatial streams) to be used by the identified client stations STA1, STA2, STA3, and STA4 for uplink transmission of training packets by the client stations to the AP and/or resources for receiving beamforming training feedback from the AP, in an embodiment.

In response to receiving the announcement data unit 202, each of the client stations STA1, STA2, STA3, and STA4 identified by the announcement data unit 202 transmits a respective beamforming training data unit 204 to the AP. In an embodiment, the client stations transmit the respective beamforming training data units 204 to the AP simultaneously as parts of an uplink multi-user transmission 206 to the AP. In an embodiment, the client stations STA1, STA2, STA3, and STA4 transmit the respective beamforming training data units 204 to the AP simultaneously using respective spatial streams and/or respective frequency portions indicated in the announcement data unit 202 received from the AP. Each of the beamforming training data units 204 includes one or more training signals, such as one or more training fields (e.g., long training fields (LTFs)), that allow the AP to estimate the communication channel from the corresponding client station to the AP, in an embodiment. Each beamforming training data unit 204 is an NDP that omits a data portion, in an embodiment. In another embodiment, one or more of the beamforming training data unit 204 includes a data portion.

In an embodiment, the client stations STA1, STA2, STA3, and STA4 initiate transmission of their respective beamforming training data units 204 upon expiration of a predetermined time interval after receiving the end of the announcement data unit 202. In an embodiment, the predetermined time interval is a time interval corresponding to a short inter-frame space (SIFS) defined by the first communication protocol (e.g., IEEE 802.11ax) and/or by a legacy communication protocol (e.g., the IEEE 802.11n/ac). In another embodiment, the predetermined time interval is a suitable time interval different from SIFS time interval.

The AP receives the beamforming training data units 204, and determines, based on the beamforming training data units 204, respective channel estimates for the communication channels from the client stations STA1, STA2, STA3, and STA4 to the AP. Based on the determined channel estimates, the AP generates respective beamforming feedback data units 206 to be transmitted to the client stations STA1, STA2, STA3, and STA4. In an embodiment, beamforming feedback information for a client station STA1, STA2, STA3, and STA4 is generated differently depending on whether the client station will use the beamforming feedback for single user transmission to the AP (SU feedback) or will use the beamforming feedback for multi-user uplink transmission to the AP (MU feedback). In an embodiment, for example, if the client station will use the beamforming feedback for beamforming uplink SU transmission, then the AP generates the beamforming feedback information for the client station based on the channel estimate determined for the client station itself without taking into account channel estimates determined for other ones of the client stations, in an embodiment. On the other hand, if the client station will use the beamforming feedback for beamforming uplink MU transmission, then the AP generates the beamforming feedback information for the client station based on the channel estimate determined for the client station itself and channel estimates determined for other ones of the client stations, in an embodiment.

Each respective data unit 206 includes beamforming feedback information for a corresponding client station STA1, STA2, STA3, STA4, such as the channel estimate obtained for the client station STA1, STA2, STA3, STA4, steering matrix coefficients (in uncompressed or compressed form) generated based on the channel estimate obtained for the client station STA1, STA2, STA3, STA4, etc. In an embodiment, the AP transmits the respective beamforming feedback data unit 206 to the client stations STA1, STA2, STA3, STA4 as parts of a downlink multi-user data unit 208 to the client stations STA1, STA2, STA3, STA4. The downlink multi-user data unit 208 includes the respective beamforming feedback data unit 206 in respective frequency portions and/or respective spatial streams allocated for downlink multi-user transmission to the client stations STA1, STA2, STA3, and STA4, in various embodiments.

In an embodiment, the AP initiates transmission beamforming feedback data unit 208 upon expiration of a predetermined time interval after receiving the end of the beamforming training data units 204. In an embodiment, the predetermined time interval is a time interval corresponding to a inter-frame space (IFS) defined by the first communication protocol (e.g., IEEE 802.11ax) and/or by a legacy communication protocol (e.g., the IEEE 802.11n/ac). In another embodiment, the predetermined time interval is a suitable time interval different from IFS time interval.

Upon successful receiving their respective beamforming feedback data units 206 from the AP, the client stations STA1, STA2, STA3, STA4 transmit respective acknowledgement data units 210 to the AP. In an embodiment, the client stations STA1, STA2, STA3, STA4 transmit their respective acknowledgement data units 210 simultaneously as parts of an OFDMA and/or MU-MIMO transmission 212 to the AP. In an embodiment, transmission of the acknowledgement data units 210 is triggered by the beamforming feedback data unit 208. In an embodiment, respective resources (e.g., frequency portions and/or spatial streams) to be used by the client stations STA1, STA2, STA3, and STA4 for transition of the acknowledgement data units 210 are indicated to the client stations STA1, STA2, STA3, and STA4 in the downlink data unit 208, such as in one or more physical layer (PHY) signal fields of the downlink data unit 208, in a trigger frame included in the data unit 208, in an HE control field of a MAC header of the data unit 208, and/or in another suitable portion of the data unit 208. In some embodiments, the client stations STA1, STA2, STA3, and STA4 use same respective resources (e.g., frequency portions and/or spatial streams) as the resources that were used to transmit the respective feedback data units 206 to the client stations STA1, STA2, STA3, and STA4. Indications of resources are omitted from the data unit 208, in such embodiments. In some embodiments, transmission parameters (e.g., transmit power, acknowledgement type, data unit length, etc.) to be used by the client stations STA1, STA2, STA3, and STA4 for transition of the acknowledgement data units are indicated in the downlink data unit 208, such as in one or more physical layer (PHY) signal fields of the downlink data unit 208.

In the embodiment of FIG. 2, respective data units 206 are transmitted to the client stations STA1, STA2, STA3, and STA4 using a single downlink multi-user data unit 208 to the client stations STA1, STA2, STA3, and STA4. In another embodiment, however, the downlink multi-user 208 includes respective data units 206 for some by not all of the client stations STA1, STA2, STA3, and STA4. In an embodiment in which the data unit 208 includes respective data units 206 for some by not all of the client stations STA1, STA2, STA3, and STA4, more resources (e.g., larger frequency portions and/or greater numbers of spatial streams) are used for transmission of feedback to the other ones of the client stations. In an embodiment, one or more beamforming feedback data units 206 that are not included in the data unit 208 are subsequently transmitted by the AP using one or more additional downlink transmissions to the corresponding client stations from the AP. As just an example, the AP includes the data unit 206-1 for the client station STA1 and the data unit 206-1 for the client station 206-2 in the data unit 208, and omits the data unit the data unit 206-3 for the client station STA3 and the data unit 206-4 for the client station 206-4 from the data unit 208, in an embodiment. The AP transmits the data unit 206-3 and the data unit 206-4 to the client stations STA3, STA4 using an additional multi-user downlink data unit transmitted upon expiration of a predetermined time interval such as SIFS after the end of reception of the ACK data unit 210, in an embodiment. The client stations STA3, STA4 then transmit acknowledgement data units to the AP to acknowledge receipt of their data units 206, in an embodiment.

Although the transmission sequence 200 is described with respect to beamforming training simultaneously performed with multiple client stations, a similar transmission sequence is used in beamforming training performed between an AP and only one client station, in an embodiment. For example, the announcement data unit 202 transmitted by the AP indicates only one client station as an intended participant in a beamforming training procedure, in an embodiment. In response to receiving the announcement data unit 202, the one client station that is identified by the announcement data unit 202 transmits a beamforming training data unit 204 to the AP, in this embodiment. The AP generates and transmits one feedback data unit 206 for the one client station and transmits the feedback data unit 206 in a single user downlink transmission to the client station, in an embodiment. Upon receiving the data unit 206, the client station transmits an acknowledgement data unit to the AP, in an embodiment.

Figure 3:
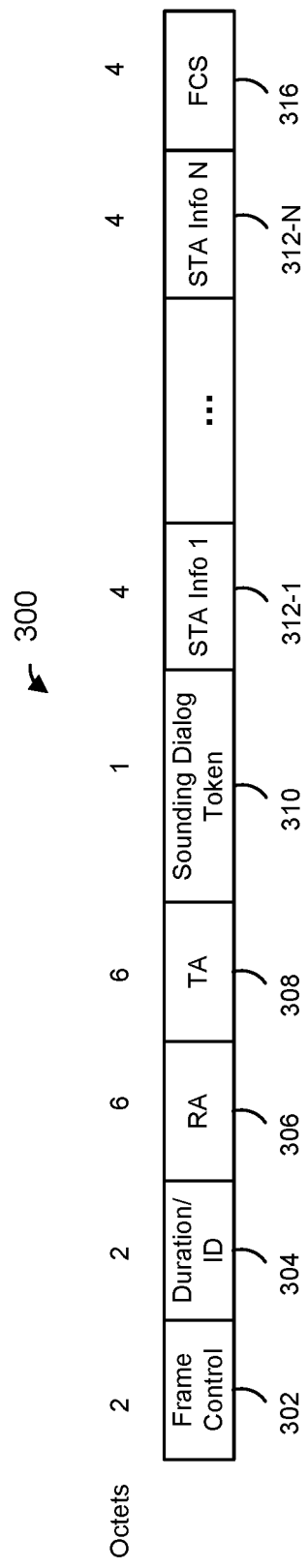
FIG. 3 is a block diagram of a control frame for announcing beamforming training, according to an embodiment.

FIG. 3 is a block diagram of a control frame (e.g., HE control field) 300, such as an uplink beamforming training NDP announcement control frame defined by the first communication protocol, according to an embodiment. In an embodiment, the control frame 300 is included in the announcement data unit 202 of the transmission sequence 200 of FIG. 2. For ease of explanation, the control frame 300 is described with respect to the announcement data unit 202 of the transmission sequence 200 of FIG. 2. However, the control frame 300 is included in an announcement data unit different from the announcement data unit 202 of FIG. 2 and/or is used in a transmission sequence different from the transmission sequence 200 of FIG. 2, in some embodiments. The control frame 300 includes a plurality of fields, including a frame control field 302, a duration/ID field 304, a first address field (e.g., a receiver address (RA) field) 306, a second address field (e.g., a transmitter address (TA) field) 308, a sounding dialog token field 310, a plurality of station (STA) information fields (also referred to herein as "per-user information fields") 312, and a frame check sequence 316. The number of octets allocated to each of the fields of the control frame 300, according to an example embodiment, is indicated in FIG. 3 above the corresponding field. Other suitable numbers of octets (or bits) are allocated to at least some of the fields of the control frame 300, in other embodiments.

In an embodiment, the first address field (RA field) 306 includes a broadcast MAC address to indicate that the control frame 300 is a broadcast control frame intended for multiple client stations (e.g. all of the client stations 25 of the WLAN 10), in an embodiment. The second address field (TA field) 308 includes the address of the AP, in an embodiment. The sounding dialog token field 310 includes a sounding token value, in an embodiment. The STA information fields 312 identify client stations that are intended participants of the beamforming training being announced by the control frame 300, and provide resource allocations and other beamforming training control information to the identified client stations, in an embodiment.

Figure 4:
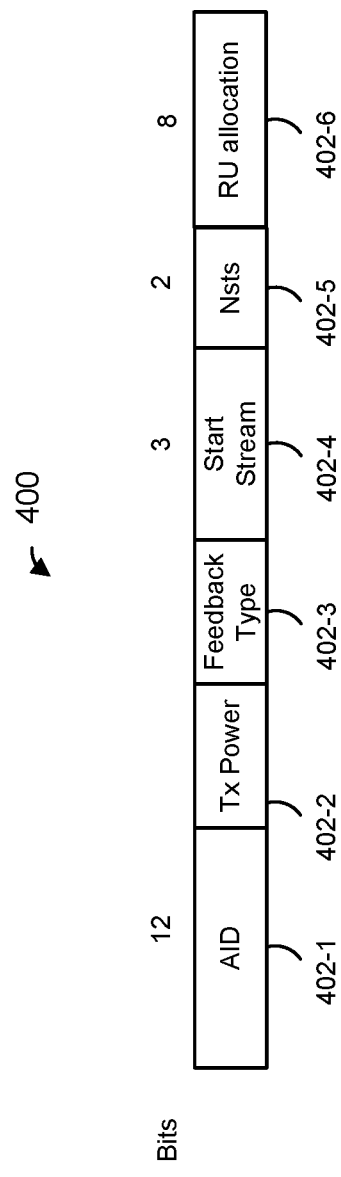
FIG. 4 is a block diagram of an information field included in the control frame of FIG. 3, according to an embodiment.

FIG. 4 is a block diagram of an STA information field 400, according to an embodiment. In an embodiment, the STA information field 400 corresponds to each of STA information fields 312 of FIG. 3. The STA information field 400 includes a plurality of subfields 402, including an AID subfield 402-1, a transmit (Tx) power subfield 402-2, a feedback type subfield 402-3, a start stream subfield 402-4, a number of space time streams (Nsts) subfield 402-5, and a resource unit (RU) allocation subfield 402-6. The number of bits allocated to the subfields 402, according to an example embodiment, is indicated in FIG. 4 above the corresponding subfield 402. Other suitable numbers or bits are allocated to at least some of the subfields 402, in other embodiments.

In an embodiment, the AID subfield 402 includes an identifier of a client station, such as a full association identifier (AID) of the client station, or a partial association identifier (PAID) of the client station. The Tx power subfield 402-2 indicates a power level at which a beamforming packet is to be transmitted by the client station identified by the AID subfield 402-1, in an embodiment. The feedback type subfield 402-3 indicates a type of feedback that will be provided to the client station identified by the AID subfield 402-1, in an embodiment. For example, the feedback type field 402-3 indicates whether SU feedback for use in single user uplink transmission or MU feedback for use in multi-user uplink transmission will be provided, in an embodiment. In an embodiment, the feedback type subfield 402-3 is omitted from the STA information field 400. For example, a feedback type indication is instead included in the BF feedback data unit 208, in an embodiment.

With continued reference to FIG. 4, the start stream subfield 402-4 and the Nsts subfield 402-5 indicate a number of a first spatial stream and a number of the spatial streams, respectively, allocated to the client station identified by the AID subfield 402-1 for transmission of a beamforming training packet by the client station. Thus, the start stream subfield 402-4 and the Nsts subfield 402-5 collectively indicate to the client station identified by the AID subfield 402-1 the spatial streams that the client station should use to transmit a beamforming training packet to the AP, in an embodiment. The RU allocation subfield 402-6 indicates a subchannel (e.g., one or more resource units) allocated for transmission of a beamforming training packet by the identified by the AID subfield 402-1, in an embodiment. For example, the RU allocation subfield 402-6 indicates a start of a subchannel and a bandwidth of the subchannel allocated for transmission of a beamforming training packet by the client station identified by the AID subfield 402-1, in an embodiment.

In some embodiments, the RU allocation subfield 402-6 is omitted from STA information field 400 or is reserved in the STA information field 400. For example, the RU allocation subfield 402-6 is omitted or reserved in an embodiment in which respective beamforming training packets being triggered by the control frame 300 are to be transmitted using MU-MIMO transmission over entire channel bandwidth, such as the data unit entire bandwidth indicated by a bandwidth indication in a PHY preamble (e.g., in an HE SIG field) of the data unit that includes the control frame 300. Similarly, in an embodiment, the start stream subfield 402-4 and the Nsts subfield 402-5 are omitted from the STA information field 400 or are reserved in the STA information field 400. For example, the start stream subfield 402-4 and the Nsts subfield 402-5 are omitted or reserved if the subchannel indicated by the RU allocation subfield 402-6 is allocated for transmission of a beamforming training packet by only one client station (i.e., the client station identified by the AID subfield 402-1).

Figure 5:
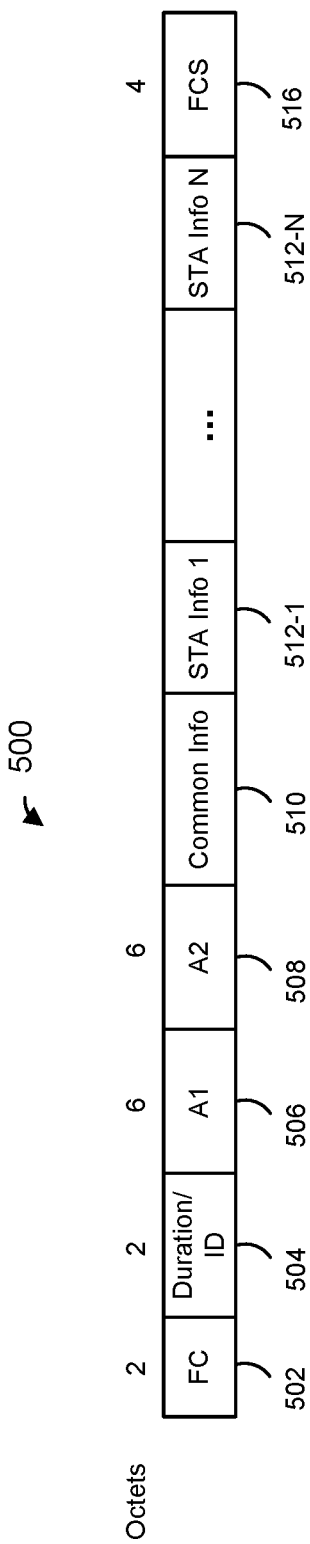
FIG. 5 is a block diagram of a trigger frame of beamforming trigger type, according to an embodiment.

FIG. 5 is a block diagram of a trigger frame 500 of beamforming trigger type, according to an embodiment. In an embodiment, the trigger frame 500 is included in the announcement data unit 202 of the transmission sequence 200 of FIG. 2. For ease of explanation, the trigger frame 500 is described with respect to the announcement data unit 202 of the transmission sequence 200 of FIG. 2. However, the trigger frame 500 is included in an announcement data unit different from the announcement data unit 202 of FIG. 2 and/or is used in a transmission sequence different from the transmission sequence 200 of FIG. 2, in some embodiments. The trigger frame 500 includes a plurality of fields, including a frame control field 502, a duration/ID field 504, a first address field (e.g., a receiver address (RA) field) 506, a second address field (e.g., a transmitter address (TA) field) 508, a common information field 510, a plurality of station (STA) information fields 512, and a frame check sequence 516. The number of octets allocated to each of the fields of the trigger frame 500, according to an example embodiment, is indicated in FIG. 5 above the corresponding field. Other suitable numbers of octets (or bits) are allocated to at least some of the fields of the trigger frame 500, in other embodiments.

In an embodiment, the first address field 506 and the second address field 508 are generally the same as or similar to the duration field 304, the duration field 306, the first address field 306 and the second address field 308, respectively, described above with respect to FIG. 3. The common information field 510 and the STA information fields 512 generally identify the client stations that are intended participants in the beamforming training being triggered by the trigger frame 500 and provide resource allocations and other beamforming training control information to the identified client stations, in an embodiment, where the common field 510 includes information that is common to the identified client stations, and the STA information fields 512 include user-specific information for respective ones of the identified client stations.

Figure 6:
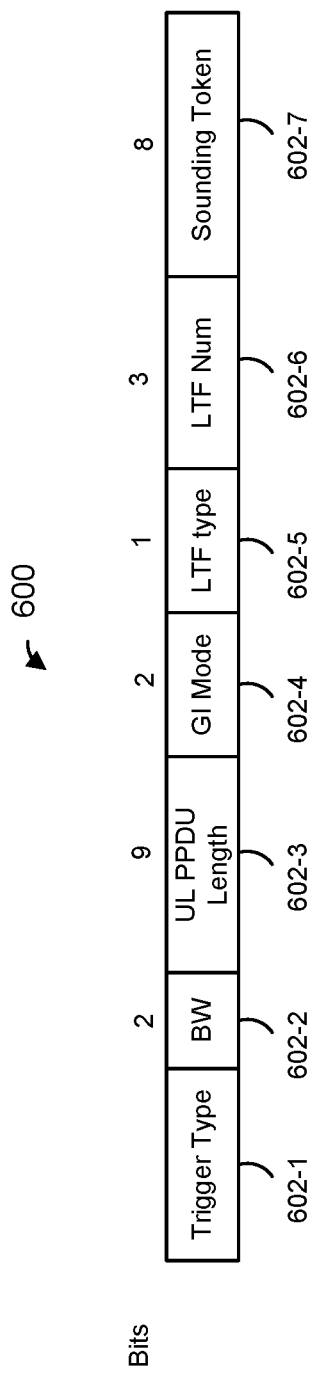
FIG. 6 is a block diagram of a common information field included in the trigger frame of FIG. 5, according to an embodiment.

FIG. 6 is a block diagram of a common information field 600 of a trigger frame included in an announcement data unit, according to an embodiment. In an embodiment, the common information field 600 corresponds to the common information field 510 of the trigger frame 500 of FIG. 5. For ease of explanation the common information field 600 is described with respect to the trigger frame 500 of FIG. 5. In another embodiment, however, the common information field 600 is included in trigger frame different from the trigger frame 500. The common information field 600 includes a plurality of subfields 602, including a trigger type subfield 602-1, a bandwidth subfield 602-2, a UL PPDU length subfield 602-3, a guard interval (GI) mode subfield 602-4, an LTF type subfield 602-5, and LTF number subfield 602-6, and a sounding dialog token subfield 602-7. The number of bits allocated to the subfields 602, according to an example embodiment, is indicated in FIG. 6 above the corresponding subfield 602. Other suitable numbers or bits are allocated to at least some of the subfields 602, in other embodiments.

In an embodiment, the trigger type subfield 602-1 is set to indicate that the trigger frame 500 is of an UL NDP trigger type. The bandwidth subfield 602-2 is set to indicate NDP packet bandwidth being triggered by the trigger frame 500. The sounding dialog token subfield 602-7 indicates a sounding token value, in an embodiment. One or more of the remaining subfields (i.e., the UL PPDU length subfield 602-3, the GI mode subfield 603-4, the LTF type subfield 602-5, and the LTF number subfield 602-6) are not needed, particularly in embodiments in which a beamforming training packet (or packets) being triggered by the trigger frame 500 is a non-data packet. Accordingly, one or more of the remaining subfields (i.e., the UL PPDU length subfield 602-3, the GI mode subfield 603-4, the LTF type subfield 602-5, and the LTF number subfield 602-6) are reserved subfields that do not include indications specific to the beamforming training packet (or packets) being triggered by the trigger frame 500, in an embodiment.

Figure 7:
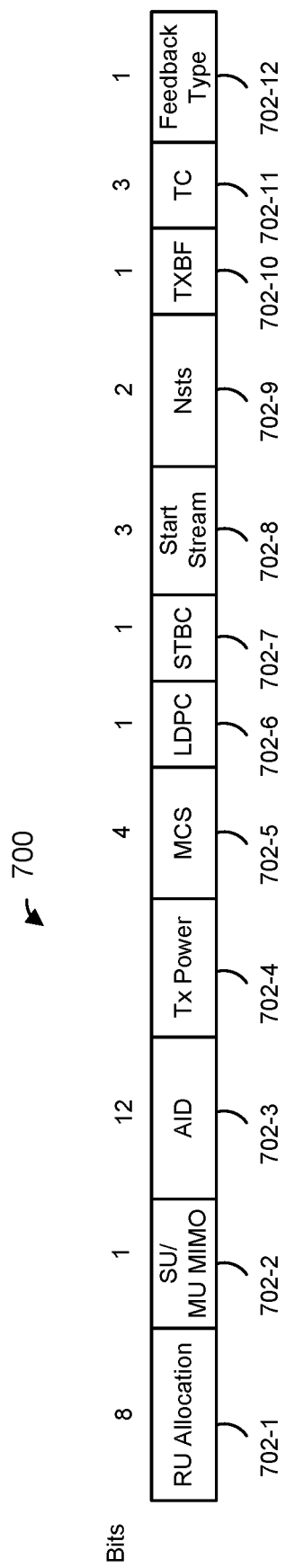
FIG. 7 is a block diagram of a per-user information field included in the trigger frame of FIG. 5, according to an embodiment.

FIG. 7 is a block diagram of a per-user information field 700 of a trigger frame included in a beamforming training announcement data unit, according to an embodiment. In an embodiment, the per-user information field 700 corresponds to each of the per-user information fields 512 of the trigger frame 500 of FIG. 5. For ease of explanation the common information field 600 is described with respect to the trigger frame 500 of FIG. 5. In another embodiment, however, the per-user information field 700 is included in a trigger frame different from the trigger frame 500. The per-user information field 700 includes a plurality of subfields 702, including a RU allocation subfield 702-1, a SU/MU MIMO subfield 702-2, an AID subfield 702-3, a Tx power subfield 702-4, a modulation and coding scheme (MCS), a low density parity check (LDPC) subfield 702-6, a space block coding subfield 702-7, a start stream subfield 702-8, an Nsts subfield 702-9, a transmit beamforming (TxBF) subfield 702-10, a traffic class (TC) subfield 702-11, and a feedback type subfield 702-12.

In an embodiment, the AID subfield 702-3 identifies a client station that is an intended participant in the beamforming training procedure being triggered by the trigger frame 500, in an embodiment. For example, the AID subfield 702-3 includes an identifier, such as a full association identifier (AID) or a partial association identifier (PAID), of a client station that is an intended participant in the beamforming training procedure, in an embodiment. The RU allocation subfield 702-1 indicates a subchannel (e.g., one or more resource units) allocated for transmission of a beamforming training packet by the AID subfield 702-3, in an embodiment. For example, the RU allocation subfield 702-1 indicates a start of a subchannel and a bandwidth of the subchannel allocated for transmission of a beamforming training packet by the client station identified by the AID subfield 702-3, in an embodiment. The Tx power subfield 702-4 indicates a power level at which a beamforming packet is to be transmitted by the client station identified by the AID subfield 702-3, in an embodiment. The start stream subfield 702-8 and the Nsts subfield 702-9 indicate a number of a first spatial stream and a number of the spatial streams, respectively, allocated for transmission of a beamforming training packet the client station identified by the AID subfield 702-3. Thus, the start stream subfield 702-8 and the Nsts subfield 702-9 collectively indicate the particular spatial streams that to the client station identified by the AID subfield 702-3 should use to transmit a beamforming training packet, in an embodiment. The feedback type subfield 702-12 indicates a type of feedback that will be provided to the client station identified by the AID subfield 702-3, in an embodiment. For example, the feedback type field 702-12 indicates whether SU feedback for use in single user uplink transmission or MU feedback for use in multi-user uplink transmission will be provided, in an embodiment. In an embodiment, the feedback type subfield 702-12 is omitted from the per-user information field 700. For example, a feedback type indication is instead included in the BF feedback data unit 208, in an embodiment.

With continued reference to FIG. 7, one or more of the remaining subfields 702 (e.g., the SU/MU MIMO subfield 702-2, the MCS subfield 702-5, the LDPC subfield 702-6, the STBC subfield 702-7, the transmit beamforming (TxBF) subfield 702-10, and/or the TC subfield 702-11), that may generally be used in trigger frames of types other than UL beamforming training trigger type, may not be needed in the trigger frame 500 of UL beamforming training trigger type, such as in embodiments in which a beamforming training packet (or packets) being triggered by the trigger frame 500 is a null data packet. Accordingly, one or more of these remaining subfields 702 in the trigger frame 500 are reserved subfields, in an embodiment.

In some embodiments, the RU allocation subfield 702-1 is omitted from the per-user information field 700 or is reserved in the per-user information field 700. For example, the RU allocation subfield 702-1 is omitted or reserved in an embodiment in which respective beamforming training packets being triggered by the trigger frame 500 are to be transmitted using MU-MIMO transmission over entire channel bandwidth, such as the data unit entire bandwidth indicated by a bandwidth indication in a PHY preamble (e.g., in an HE SIG field) of the data unit that includes the trigger frame 500. Similarly, in an embodiment, the start stream subfield 702-8 and the Nsts subfield 702-9 are omitted from the per-user information field 700 or are reserved in the per-user information field 700. For example, the start stream subfield 702-8 and the Nsts subfield 702-9 are omitted or reserved if the subchannel indicated by the RU allocation subfield 702-1 is allocated for transmission of a beamforming training packet by only one client station (i.e., the client station identified by the AID subfield 702-3).

Figure 8:
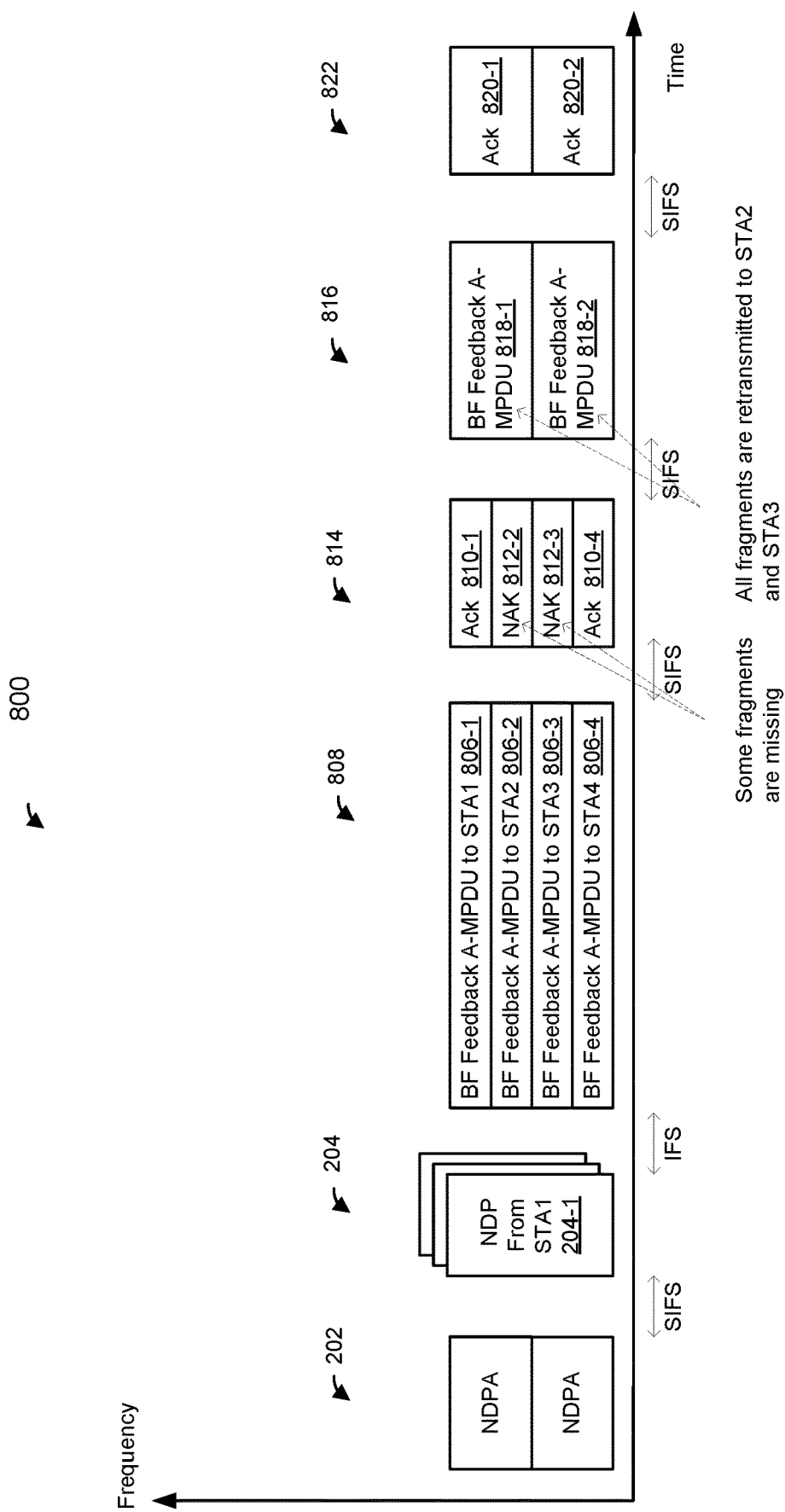
FIG. 8 is a diagram of an example transmission sequence in a WLAN, according to an embodiment.

FIG. 8 is a diagram of an example transmission sequence 800 in a WLAN, such as the WLAN 10 of FIG. 1, according to an embodiment, in which an AP, such as the AP 14, performs beamforming training with multiple client stations, such as multiple ones of the client stations 25. The transmission sequence 800 is generally similar to the transmission sequence 200 of FIG. 2. Transmission sequence 800 includes transmission of the announcement data unit 202 from the AP to the multiple client stations STA1, STA2, STA3, STA4, and transmission of the beamforming training data units 204 from the multiple client stations STA1, STA2, STA3, STA4 to the AP, in an embodiment. The AP generates, based on the beamforming data units 204, beamforming feedback information for the client stations STA1, STA2, STA3, STA4. The AP generates respective beamforming feedback data units 806 to include respective feedback information generated for the client stations. The beamforming feedback data units 806 are generally similar to the beamforming feedback data unit 206 of FIG. 2. In an embodiment, if amount of beamforming feedback information generated for a client station cannot be transmitted in a single data unit (e.g., single MPDU) to the client station because a size of the single data unit would exceed a maximum MPDU length restriction of the client station, then the AP fragments the beamforming feedback information for the client station, and generates an aggregated MPDU (A-MPDU) 806 to be transmitted to the client station to include the fragments of the beamforming feedback information for the client station. For example, in the embodiment of FIG. 8, each of beamforming feedback data unit 806 is an A-MPDU that includes fragmented feedback information. In another embodiment, one or more of the beamforming feedback data units 806 are MPDUs, and other one or more of the beamforming feedback data units 806 are A-MPDUs. For example, the beamforming feedback data units 806-1 for the client station STA1 is an MPDU, while the remaining ones of the beamforming feedback data units 806-2, 806-3, and 806-4 are A-MPDUs, in an embodiment.

The AP generates a multi-user (e.g., OFDMA and/or MU-MIMO) beamforming feedback data unit 808 that includes the respective beamforming feedback data units 806, and transmits the multi-user beamforming data unit 808 to the client stations, in an embodiment. Upon receiving its beamforming feedback data units 806, each client station determines whether all fragments in the beamforming feedback data units 806 were correctly received by the client station, in an embodiment. Based on the determination, each client station generates either an Ack data unit 810 to positively acknowledge receipt of the data unit 806 or a negative acknowledgement (NAK) data unit 812 to negatively acknowledge receipt of the data unit 806, in an embodiment. More specifically, if all of the fragments in the beamforming feedback data unit 806 were correctly received at the client station, then the client station generates and transmits an Ack data unit 810 to positively acknowledge receipt of the beamforming feedback data unit 806, in an embodiment. On the other hand, if one or more of the fragments in the beamforming feedback data unit 806 were not correctly received at the client station, then the client station generates and transmits a negative acknowledgement (NAK) data unit 812 to indicate to the AP that there was an error in at least one of the fragments in the beamforming feedback data unit 806, in an embodiment. For example, in the embodiment of FIG. 8, the client station STA2 generates and transmits a NAK data unit 812-2 to indicate to the AP that there was an error in at least one of the fragments in the beamforming feedback data unit 806-2, and the client station STA3 generates and transmits a NAK data unit 812-3 to indicate to the AP that there was an error in at least one of the fragments in the beamforming feedback data unit 806-3. Each NAK data unit 812 includes a NAK control frame defined by the first communication protocol, in an embodiment. Each NAK data unit 812 includes another suitable frame, such as a quality of service (QoS) Null frame, in another embodiment.

The client stations transmit the generated Ack data units 810 or NAK data units 812 to the AP simultaneously as parts of a multi-user (e.g., OFDMA and/or MU-MIMO) transmission 814 to the AP, in an embodiment. In an embodiment, in response to receiving a NAK data unit 812 from a client station, the AP re-transmits all of the fragments that were included in the corresponding data unit 806 to the client station. Thus, for example, in response to receiving the NAK data unit 812-2 from STA2, the AP generates a beamforming feedback data unit 816-1 to include all fragments that were included in the data unit 806-2. Similarly, in response to receiving the NAK data unit 812-2 from STA3, the AP generates a beamforming feedback data unit 816-2 to include all fragments that were included in the data unit 806-3. In response to correctly receiving the beamforming feedback data units 816, the client stations STA2, STA3 generate acknowledgement data units 820 and transmit the acknowledgement data units 820 to the AP as parts of a multi-user (e.g., OFDMA and/or MU-MIMO) transmission 822 to the AP, in an embodiment.

Figure 9:
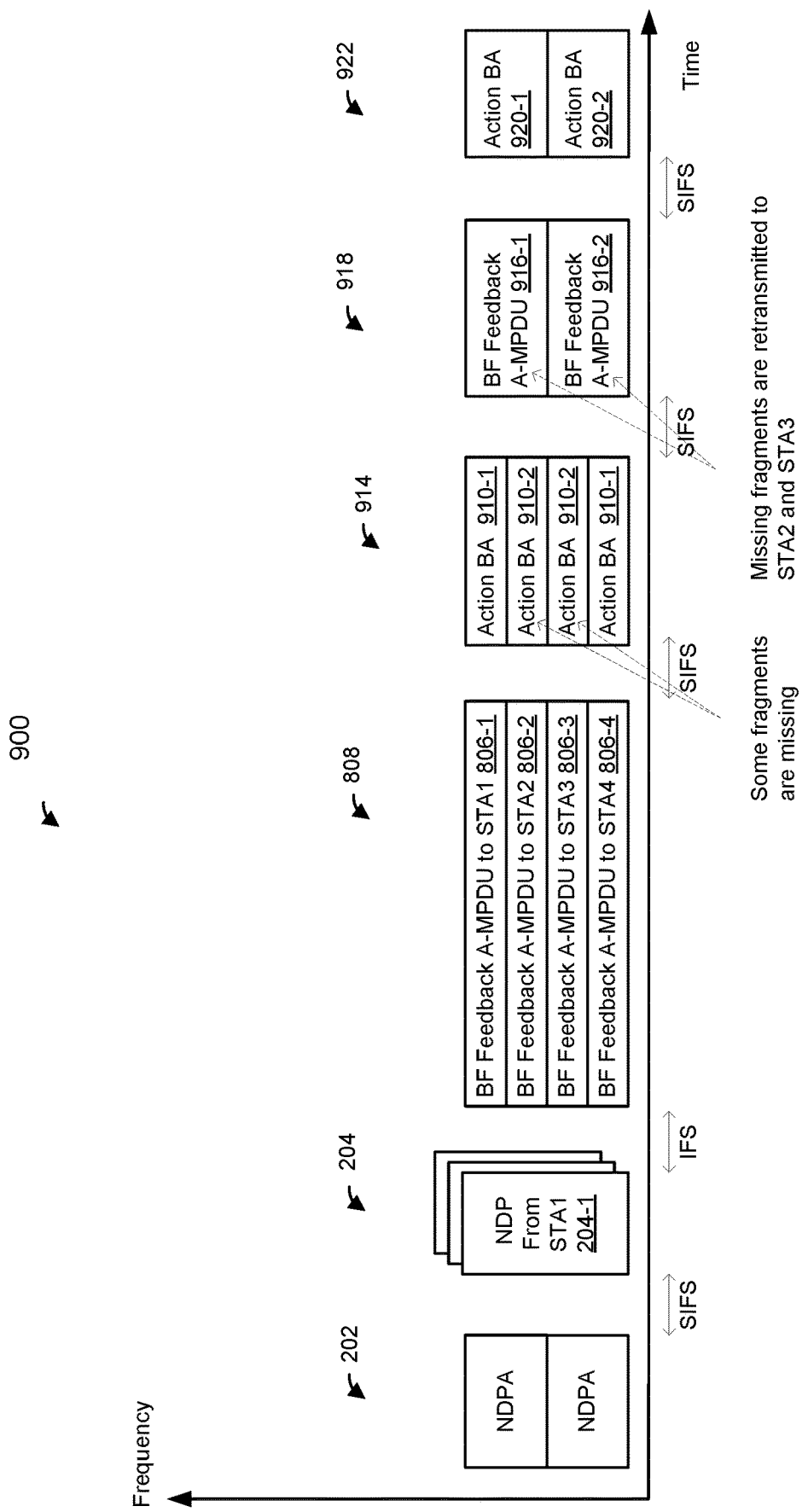
FIG. 9 is a diagram of an example transmission sequence in a WLAN, according to an embodiment.

FIG. 9 is a diagram of an example transmission sequence 900 in a WLAN, such as the WLAN 10 of FIG. 1, according to an embodiment, in which an AP, such as the AP 14, performs beamforming training with multiple client stations, such as multiple ones of the client stations 25. The transmission sequence 900 is similar to the transmission sequence 800 of FIG. 8, except that in the transmission sequence 900, rather than using Ack data units 810 or NAK data units 812 to positively or negatively acknowledge receipt of beamforming feedback data units 806, client stations use action block acknowledgement (Action BA) data units 910 to indicate whether or not respective fragments in the beamforming feedback data units 806 were correctly received by the client stations. An action BA data unit 910 includes an action BA frame defined by the first communication protocol for acknowledging receipt of multiple fragments (MPDUs) in an action data unit such as a beamforming feedback A-MPDU 806, in an embodiment. In and embodiment, an action BA data unit 910 includes a bitmap, with each bit of the bitmap set to indicate whether or not a particular fragment of the corresponding beamforming training data unit 806 was correctly received by the corresponding client station. In response to receiving an action BA data unit 910 that indicates that one or more particular fragments were not correctly received by a client station, the AP re-transmits only the particular fragments to the client station, in an embodiment.

With continued reference to FIG. 8, in an embodiment, a beamforming feedback A-MPDU 806 includes a beamforming feedback action frame that is defined, by the first communication protocol, to include a sequence of a predetermined maximum number of fragments (MPDUs). For example, an BF feedback A-MPDU 806 includes a beamforming feedback action frame defined by the first communication protocol to have at most eight fragments, with a starting sequence number of zero (0) of the first fragment and a highest sequence number of (7) of the last fragment. In an embodiment, because the action BA data unit 910 acknowledges receipt of fragments in an action frame that has at most eight fragments, with a staring sequence number of zero (0) of the first fragment, the BA data unit 910 omits a starting sequence number indication that may be included in a non-action block acknowledgement frame defined by the first communication protocol and/or a legacy communication protocol. Additionally, the bitmap included in the BA 910 is of a set size corresponding to the predetermined maximum number of fragments in the BF feedback A-MPDU 806, in an embodiment. Thus, for example, continuing with the above example with a maximum number of eight fragments, the bitmap included in the BA data unit 910 includes exactly, or at most, eight bits, in an embodiment.

The client stations transmit the generated action BA data units 910 to the AP simultaneously as parts of a multi-user (e.g., OFDMA and/or MU-MIMO) transmission 914 to the AP, in an embodiment. In the embodiment of FIG. 9, the action BA data unit 910-2 transmitted by the client station STA2 indicates that one or more particular fragments in the data unit 806-2 were not correctly received by the client station STA2, and the action BA data unit 910-3 transmitted by the client station STA3 indicates that one or more particular fragments in the data unit 806-3 were not correctly received by the client station STA3. In response to receiving the action BA 910-2 in acknowledgement data unit 914, the AP generates a beamforming feedback data unit 916-1 to include the particular fragments in the beamforming data unit 806-2 that were not correctly received by the client station STA2 and to omit the fragments that were correctly received by the client station STA2, in an embodiment. Similarly, in response to receiving the action BA data unit 910-3 in acknowledgement data unit 914, the AP generates a beamforming feedback data unit 916-2 to include the particular fragments in the beamforming data unit 806-3 that were not correctly received by the client station STA3 and to omit the fragments that were correctly received by the client station STA3, in an embodiment. The AP generates and transmits a multi-user (e.g., OFDMA and/or MU-MIMO) beamforming feedback data unit 918 and transmits the beamforming feedback data unit 918 to the client stations STA2, STA3, in an embodiment. In response to receiving the beamforming feedback data units 916, the client stations STA2, STA3 generate action BA data units 920 and transmit action BA data units 920 to the AP as parts of a multi-user (e.g., OFDMA and/or MU-MIMO) 922 to the AP, in an embodiment.

Figure 10:
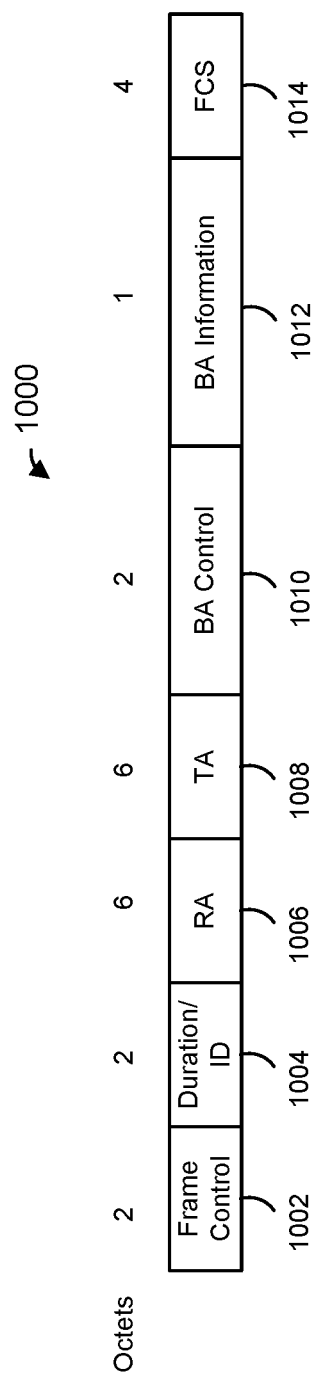
FIG. 10 is a block diagram of an action block acknowledgement frame, according to an embodiment.

FIG. 10 is a block diagram of an action BA frame 1000, according to an embodiment. In an embodiment, an action BA frame 1000 is included in each of the action BA data units 910 of the transmission sequence 900 of FIG. 9. In other embodiments, the action BA frame 1000 is included in an acknowledgement data unit different from the action BA data units 910. The action BA frame 1000 includes a plurality of fields, including a frame control field 1002, a duration field 1004, a first address field (e.g., a receiver address (RA) field) 1006, a second address field (e.g., a transmitter address (TA) field) 1008, a BA control field 1010, a BA information and a frame check sequence 316. The number of octets allocated to each of the fields of the control frame 1000, according to an example embodiment, is indicated in FIG. 9 above the corresponding field. Other suitable numbers of octets (or bits) are allocated to at least some of the fields of the control frame 1000, in other embodiments.

The BA information field 1012 includes a bitmap, with each bit of the bitmap corresponding to a particular fragment (MPDU) of a BA feedback A-MPDU 806 being acknowledged, in an embodiment. Thus, for example, in an embodiment in which the BA feedback A-MPDU includes a maximum number of eight fragments (MPDUs), the BA information field 1012 includes a bitmap having eight bits. Further, the BA information field 1012 omits a starting sequence number indication, in an embodiment. In an embodiment, the BA information field 1012 is an eight bit (one byte) field. In another embodiment, the information field 1012 includes a number of bits different from eight bits.

Figure 11:
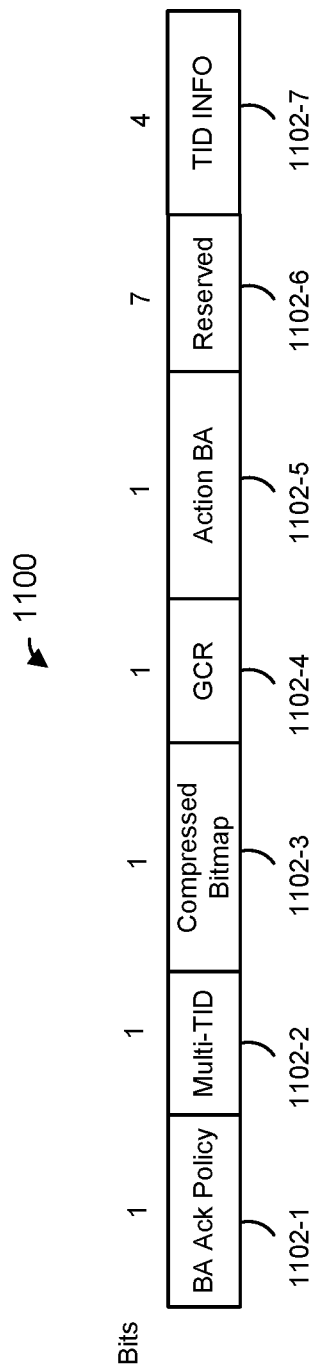
FIG. 11 is a block diagram of a block acknowledgement control field included in the action block acknowledgment frame of FIG. 10, according to an embodiment.

FIG. 11 is a block diagram of a BA control field 1100, according to an embodiment. In an embodiment, the BA control field 1100 corresponds to the BA control field 1010 of the action BA frame 1000 of FIG. 10. In another embodiment, the BA control field 1100 is included in an acknowledgement frame different from the action BA frame 1000 of FIG. 10. The BA control field 1100 includes a plurality of subfields 1102, including a BA Ack policy subfield 1102-1, a multi-TID subfield 1102-2, a compressed bitmap subfield 1102-3, a GCR subfield 1102-4, an action BA subfield 1102-5, a reserved subfield 1102-6, and a TID information subfield 1102-7.

Figure 12:
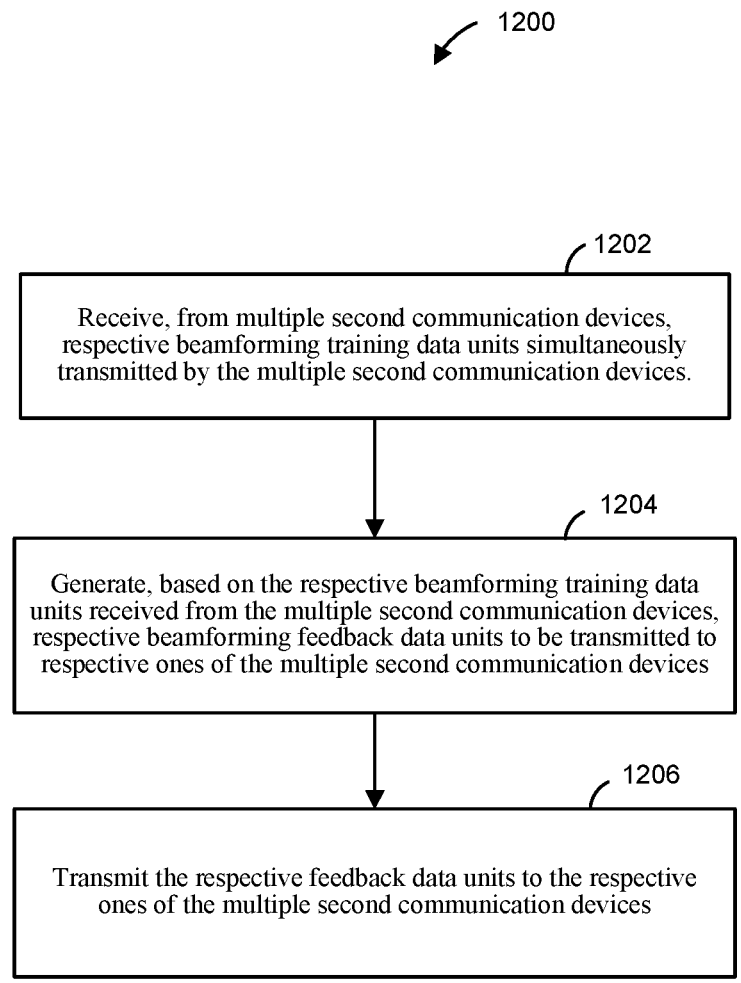
FIG. 12 is a flow diagram of an example method for beamforming training in a WLAN, according to an embodiment.

FIG. 12 is a flow diagram of an example method 1200 for beamforming training in a wireless communication network, according to an embodiment. In some embodiments, the method 1200 is implemented by the AP 14 (FIG. 1). For example, in some embodiments, the network interface device 16 (e.g., the PHY processor 20 and/or the MAC processor 18) is configured to implement the method 1200. In other embodiments, another suitable network interface device is configured to implement the method 1200.

At block 1202, respective beamforming training data units are received from multiple communication devices. In an embodiment, the beamforming training data units 204 of FIG. 2 are received. In another embodiment, other suitable beamforming training data units are received. In an embodiment, the beamforming training data units are simultaneously transmitted by the multiple communication devices, for example using respective frequency portions and/or spatial streams allocated to the multiple communication devices.

At block 1204, respective beamforming feedback data units are generated based on the respective beamforming training packets received at block 1204. In an embodiment, the beamforming feedback data units 206 of FIG. 2 are generated. In another embodiment, the beamforming feedback data units 806 of FIG. 8 are generated. In other embodiments, other suitable beamforming feedback data units are generated.

At block 1206, the respective beamforming feedback data units that are generated at block 1204 are transmitted to the multiple communication devices.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for beamforming training in a wireless communication network, the method comprising:
   transmitting, from a first communication device to multiple second communication devices, an announcement data unit that includes respective resource allocation indications indicating respective resources allocated for transmission by the multiple second communication devices, the respective resource allocation indications indicating one or both of a) respective frequency portions for transmission of respective null data packets (NDPs) by respective ones of the multiple second communication devices, and b) respective one or more spatial streams allocated for transmission of the respective NDPs by the respective ones of the multiple second communication devices;
   receiving, at the first communication device from the multiple second communication devices, respective NDPs simultaneously transmitted by the multiple second communication devices, wherein the respective NDPs i) include respective sets of one or more training signals that allow the first communication device to estimate a communication channel from the corresponding second communication device to the first communication device, ii) were transmitted by the respective second communication devices using the one or both of a) respective frequency portions and b) respective one or more spatial streams indicated by the respective resource allocation indications in the announcement data unit that was transmitted to the multiple second communication devices, and iii) omit respective data portions;
   generating, at the first communication device based on the respective sets of one or more training signals included in the respective NDPs received from the multiple second communication devices, respective beamforming feedback data units to be transmitted to respective ones of the multiple second communication devices, including generating an aggregate media access control protocol data unit (A-MPDU) to include a plurality of fragments of beamforming training information for a particular second communication device; and
   transmitting, from the first communication device, the respective feedback data units to the respective ones of the multiple second communication devices, comprising transmitting the respective feedback data units including the A-MPDU in a single physical layer (PHY) data unit.

2. The method of claim 1, further comprising
   receiving, at the first communication device, a negative acknowledgement data unit that indicates that at least one of the plurality of fragments were not correctly received by the particular second communication device, and
   in response to receiving the negative acknowledgement, retransmitting the plurality of fragments from the first communication device to the particular second communication device in a subsequent single PHY data unit.

3. The method of claim 1, further comprising
   receiving, at the first communication device, an action block acknowledgement data unit that indicates particular one or more fragments, of the plurality of fragments, that were not correctly received by the particular second communication device, and
   in response to receiving the negative acknowledgement, retransmitting the indicated particular one or more fragments, of the plurality of fragments, from the first communication device to the particular second communication device in a subsequent single PHY data unit without retransmitting all of the fragments, of the plurality of fragments, to the particular second communication device.

4. The method of claim 1, wherein transmitting the respective beamforming feedback data units to the respective ones of the multiple second communication devices comprises simultaneously transmitting the respective beamforming feedback data units to at least some of the multiple second communication devices.

5. The method of claim 1, further comprising receiving, at the first communication device from a particular second communication device of the multiple second communication device, an uplink single user transmission that is beamformed based on the respective beamforming feedback data units transmitted to the multiple second communication devices.

6. The method of claim 1, further comprising receiving, at the first communication device from the multiple second communication devices, an uplink multi-user user transmission that is beamformed based on the respective beamforming feedback data units transmitted to the multiple second communication devices.

7. The method of claim 6, wherein the uplink multi-user transmission is one of (i) orthogonal frequency division multiple access (OFDMA) transmission and (ii) a multi-user multiple input multiple output (MU-MIMO) transmission.

8. An apparatus, comprising:
   a network interface device having one or more integrated circuits configured to
      transmit an announcement data unit to multiple communication devices, the announcement data unit including respective resource allocation indications indicating respective resources allocated for transmission by the multiple communication devices, the respective resource allocation indications indicating one or both of a) respective frequency portions for transmission of respective null data packets (NDPs) by respective ones of the multiple second communication devices, and b) respective one or more spatial streams allocated for transmission of the respective NDPs by the respective ones of the multiple second communication devices;

receive respective NDPs simultaneously transmitted by the multiple communication devices, wherein the respective NDPs i) include respective sets of one or more training signals that allow the network interface device to estimate a communication channel from the corresponding one of the multiple communication devices to the network interface device, ii) were transmitted by the respective ones of the multiple communication devices using the one or both of a) respective frequency portions and b) respective one or more spatial streams indicated by the respective resource allocation indications in the announcement data unit that was transmitted to the multiple communication devices, and iii) omit respective data portions;

generate, based on the respective sets of one or more training signals included in the respective beamforming training data units received from the multiple communication devices, respective beamforming feedback data units to be transmitted to respective ones of the multiple communication devices, including generating an aggregate media access control protocol data unit (A-MPDU) to include a plurality of fragments of beamforming training information for a particular second communication device; and transmit the respective beamforming feedback data units to the respective ones of the multiple communication devices, comprising transmitting the respective feedback data units including the A-MPDU in a single physical layer (PHY) data unit.

9. The apparatus of claim 8, wherein the one or more integrated circuits are further configured to receive a negative acknowledgement data unit that indicates that at least one of the plurality of fragments were not correctly received by the particular one of the multiple communication devices, and in response to receiving the negative acknowledgement data unit, retransmit the plurality of fragments from the first communication device to the particular one of the multiple communication devices in a subsequent single PHY data unit.

10. The apparatus of claim 8, wherein the one or more integrated circuits are further configured to receive an action block acknowledgement data unit that indicates particular one or more fragments, of the plurality of fragments, that were not correctly received by the particular one of the multiple communication devices, and in response to receiving the action block acknowledgement data unit, retransmit the indicated particular one or more fragments, of the plurality of fragments, from the first communication device to the particular second communication device in a subsequent single PHY data unit without retransmitting all of the fragments, of the plurality of fragments, to the particular one of the multiple communication devices.

11. The apparatus of claim 8, wherein the one or more integrated circuits are configured to simultaneously transmit the respective beamforming feedback data units to at least some of the multiple communication devices.

12. The apparatus of claim 8, wherein the one or more integrated circuits are further configured to receive, from a particular one of the multiple communication devices, an uplink single user transmission that is beamformed based the respective beamforming feedback data units transmitted to the multiple communication devices.

13. The apparatus of claim 8, wherein the one or more integrated circuits are further configured to receive, from the multiple communication devices, an uplink multi-user transmission that is beamformed based the respective beamforming feedback data units transmitted to the multiple communication devices.

14. The apparatus of claim 13, wherein the uplink multi-user transmission is one of (i) orthogonal frequency division multiple access (OFDMA) transmission and (ii) a multi-user multiple input multiple output (MU-MIMO) transmission.

* * * * *